April 11, 1967

J. C. FREEBORN 3,313,876

RADAR TARGET SIGNAL GENERATING APPARATUS

Filed Feb. 24, 1965

INVENTOR.
JOHN C. FREEBORN
BY Charles J. Ungemach
ATTORNEY

United States Patent Office 3,313,876
Patented Apr. 11, 1967

3,313,876
RADAR TARGET SIGNAL GENERATING
APPARATUS
John C. Freeborn, West Covina, Calif., assignor to Honeywell Inc., Minneapolis, Minn., a corporation of Delaware
Filed Feb. 24, 1965, Ser. No. 434,879
5 Claims. (Cl. 35—10.4)

This invention relates to radar and more particularly concerns apparatus to be used with a radar set for simulating a radar target.

This invention provides a radar target generator, the output of which can be injected into an operational radar display, thereby producing an artificial or simulated target. The radar target generator is used in conjunction with an operational radar for training purposes, to maintain operator skill and efficiency during periods when actual targets are unavailable.

It is an object of this invention to provide a radar target generator.

It is another object of this invention to provide a radar target generator of relatively small size, low cost, and one that can be installed in an existing operational radar without extensive modification of the radar. In addition, it is an object to provide a target generator for training purposes wherein the normal operation of the radar need not be interrupted.

Other objects and advantages of this invention will further become apparent after reading the specification in connection with the drawings, in which.

Figure 1:
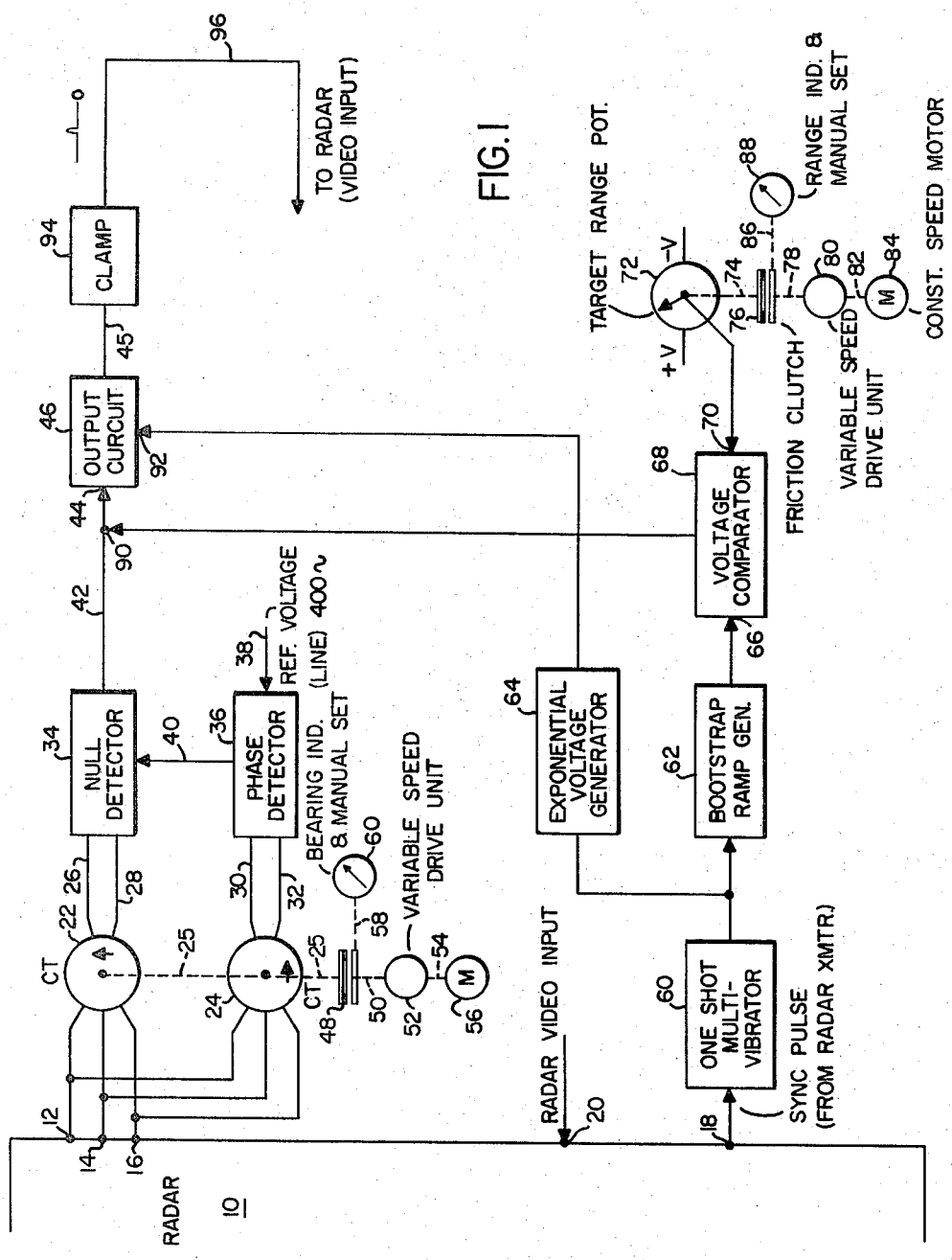
FIGURE 1 is a block diagram of a radar target generator.

In describing the embodiment of the invention illustrated in the drawings, specific terminology will be used for the sake of clarity. However, it is not intended to be limited to the specific terms so selected and it is to be understood that each specific term includes all technical equivalents that operate in a similar manner to accomplish a similar purpose.

Briefly, the operational radar provides the target generator of the present invention with a synchro signal related to antenna bearing, and with a trigger pulse, derived from the main transmitter pulse (main-bang), for synchronization. The trigger pulse sets a one-shot multivibrator designed to reset in just under one pulse interval. The one-shot multivibrator controls a ramp generator which produces a voltage ramp coincident with the sweep of the display CRT in the operational radar. A voltage comparator produces a very brief pulse when the ramp voltage coincides with a slowly varying D.-C. voltage supplied by a target range potentiometer. The output pulse of the comparator becomes, after some additional processing, the artificial or simulated target signal.

In FIGURE 1, an operational radar device 10 produces two signals for use in the radar target generator. One signal appears at output terminals 12, 14 and 16 of radar device 10, and the other signal appears at output terminal 18. The output signal appearing at terminals 12, 14 and 16 is a 3-phase signal derived from a synchro transmitter (not shown) associated with an antenna (not shown) of radar device 10. The signal appearing at output terminal 18 is a trigger pulse coincident in time with pulses produced and transmitted by radar device 10. Radar device 10 also has an input terminal 20, called the video input terminal, which forms an input to a video section (not shown) of radar device 10.

The 3-phase signal present at terminals 12, 14 and 16, representing the bearing of the radar antenna, is fed to the stator windings of control transformers 22 and 24 respectively. The rotors of control transformers 22 and 24 are angularly displaced at 90 degrees with respect to each other and connected by a mechanical link, shown as dashed line 25. The output of control transformer 22, which is induced in a rotor winding therein, and is present on output lines 26 and 28, is fed to an input of a null detector 34. An output signal developed by a rotor winding of control transformer 24 is present on output lines 30 and 32 and is fed to an input of a phase detector 36. Supply line voltage, which, for example, may be a 400-cycle voltage, serves as a reference voltage and is fed to another input of the phase detector 36 on conducting means 38. The output of phase detector 36 is conducted on an output line 40 which is connected to another input to null detector 34. The output of null detector 34 is conducted on line 42 and is fed to a first input 44 of an output circuit 46.

Mechanical link 25, joining the rotors of control transformers 22 and 24, is connected to the top plate of a friction clutch 48. The bottom plate of friction clutch 48 is connected by mechanical means, shown as dashed line 50, to the output of a variable speed drive unit 52. Drive unit 52 may include, for example, variable gear reduction means. The input to drive unit 52 is connected by a mechanical link, shown as dashed line 54, to a constant speed motor 56. Friction clutch 48 is also connected by a mechanical means, shown as dashed line 58, to a bearing indicator and a manual set control 60. When clutch 48 is engaged, motor 56 causes the rotors of control transformers 22, 24 to rotate at a rate dependent upon the variable speed drive unit 52 to automatically vary the bearing. The friction clutch also permits overriding the power input and manually setting the desired bearing.

The trigger pulse appearing at output terminal 18 of radar 10, used to sync the radar target generator, is fed to the input of a one-shot multivibrator 60 causing it to be energized for a period of time slightly shorter than the period between successive trigger pulses. The output of one-shot multivibrator 60 is fed to the input of a Bootstrap ramp generator 62 and also to the input of an exponential voltage generator 64. The output of ramp generator 62 corresponding in time to the sweep time of a radar CRT display unit (not shown) in radar device 10, is fed to an input means 66 of a voltage comparator 68. A second input means 70 of comparator 68 is connected to the arm of a target range potentiometer 72. The arm of potentiometer 72 is connected by mechanical means shown as dashed line 74 to the top plate of a friction clutch 76 similar in construction to clutch 48. The bottom plate of clutch 76 is connected by mechanical means 78, shown as a dashed line, to the output of a variable speed drive unit 80. Variable speed drive unit 80 is similar to unit 52 and like unit 52 may include a variable gear reduction means. The input to unit 80 is connected by a mechanical link, shown as dashed line 82, to a constant speed motor 84. When clutch 76 is engaged, motor 84 causes the arm of pot 72 to rotate at a rate dependent upon the variable speed drive unit 80. A mechanical link, shown as dashed line 86, connects clutch 76 to a range indicator and manual set control 88. The friction clutch 76 enables the manual set control 88 to override the power input from drive unit 80 when it is desired to manually set range.

When the voltages appearing at input means 66 and 70, respectively, of voltage comparator 68 are substantially equal in amplitude, a target pulse is produced at the output of comparator 68 and is fed to a summing point 90 located on line 42. The output of exponential voltage generator 64 is fed to a second input means 92 of output, or gating, circuit 46. The output of circuit 46 is fed to the input of a clamp 94, the output of which appears on line 96 which is returned to the video input terminal 20 of radar device 10.

To simplify the explanation of the operation, assume that the antenna associated with radar device 10 is rotating, and that the rotors of control transformers 22, 24 are stationary. As the radar antenna is rotated through 360 degrees, two voltage nulls will occur across the rotor winding of control transformer 22. The null points occur when the axis of the control transformer rotor winding corresponds to the direction in which the antenna is pointing. The occurrence of a null point deenergizes the input circuit of null detector 34. One of the null points is a true null with respect to the antenna heading and the other null is a false null, 180 degrees out of phase with the true null, which must effectively be cancelled. The effective cancellation is performed by phase detector 36 which compares the phase of the line voltage appearing on input line 38 with the phase of the voltage produced by the rotor winding of control transformer 24. Since the rotor winding of control transformer 24 is angularly displaced 90 degrees with respect to the rotor winding of control transformer 22, whenever a null point occurs at the output of control transformer 22, a maximum point occurs at the output of control transformer 24. By properly phasing the inputs to phase detector 36, an output appears on line 40 which causes the null detector to produce a positive going signal on output line 42 only when the rotor of control transformer 22 corresponds to the true null position. The positive going voltage on output line 42 tends to remove a normally back biasing voltage present across the input 44 of circuit 46. During the relatively long time that the back bias is removed by the positive going voltage produced by null detector 34, a target pulse from the output of voltage comparator 68 is presented at the summing point 90 on line 42 (due to the normal operation of radar device 10) and this signal is developed across the input 44 of output circuit 46. Actually a series of pulses occur, one for each transmitter pulse. The degree of amplification of the target pulse presented at output 45 of output circuit 46 is determined by the exponential voltage occurring at input 92 of circuit 46. This occurs because the voltage appearing at input 92 of circuit 46, back biasing circuit 46, tends to attenuate the output of circuit 46, which represents the target pulse. Target pulses occurring relatively late in the sweep period have relatively more attenuation than target pulses occurring earlier in the sweep time. Clamp 94 clamps the target pulse, appearing on line 96, to ground, or zero potential, and the target pulse is fed on output line 96 back to the video input terminal 20 of radar device 10.

It has been assumed, for purposes of explanation, that the rotor of control transformer 22 is stationary. Under this assumption the artificial target injected into the video section of the radar, and subsequently appearing on the radar display, will not appear to change bearing. The apparent bearing of the target depends entirely on the angular position of shaft 25. When shaft 25 is stationary a target will be generated when the radar antenna is at a position producing a voltage null across lines 26 and 28. Rotating the radar antenna will not change target bearing. When the rotors of control transformers 22, 24 are rotating (at a rate different from that of the radar antenna), however, the artificial target will appear to change bearing since the null points, corresponding to coincidence, will be constantly changing. Accordingly, a simulated target with a changing bearing is generated for training purposes. It is possible, by adjusting the rate of shaft 25 with respect to shaft 74, to set in a predetermined target course, for example, a spiral course.

Figure 2:
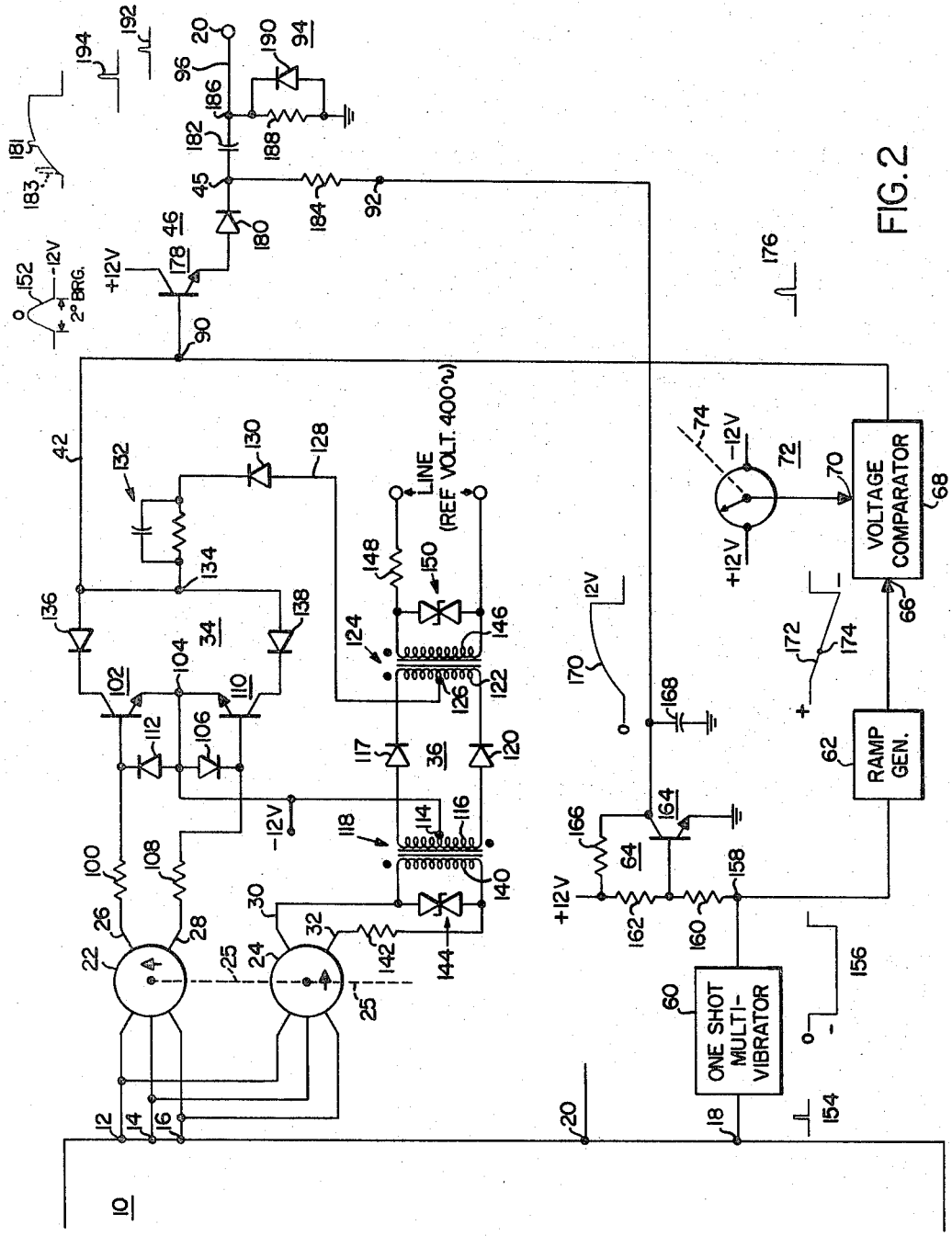
FIGURE 2 is a simplified schematic diagram of a radar target generator.

The operation of the radar target generator will be described in somewhat greater detail with reference to portions of the simplified schematic diagram of FIGURE 2. Assuming that output line 26 of control transformer 22 is positive with respect to output line 28, current flows along line 26 to the right through a resistor 100 to the base of a transistor 102, out the emitter of transistor 102 to a junction point 104, from junction 104 to the anode of a diode 106, out the cathode of diode 106, through a resistor 108 back to output line 28. In this case, transistor 102 is forward biased. If the polarity of lines 26 and 28 is reversed, that is, if line 28 of control transformer 22 is positive with respect to line 26, current flows to the right along line 28, through resistor 108 to the base of a transistor 110, out the emitter of transistor 110 to junction point 104, from junction point 104 to the anode of a diode 112, out the cathode of diode 112 and through resistor 100 back to output line 26. In this case, transistor 110 is forward biased. The junction point 104 is connected to a −12-volt source and is also connected to a center tap 114 of a secondary winding 116 of a transformer 118. There are two paths for current to flow from the emitters of transistors 102 and 110 to their respective collectors. One such path is from junction 104 to the center tap 114 of the secondary winding 116 of a transformer 118, downward through the lower half of the secondary winding 116 to the anode of a diode 120, out the cathode of diode 120 and through the lower half of the center tapped secondary winding 122 of a transformer 124, out the center tap terminal 126 on winding 122, along a line 128 to the anode of a diode 130, from the cathode of diode 130 through a parallel R–C network 132 to a junction point 134. The second path is the same except that from center tap terminal 114 current flows up through the upper half of secondary winding 116, through diode 117 in the forward direction, and down through the upper half of secondary winding 122 to terminal 126. The path taken depends upon the relative phasing of the voltages on transformers 118, 124. From junction point 134, current can flow through a forward poled diode 136 to the collector of transistor 102 or through a forward poled diode 138 to the collector of transistor 110 depending upon which transistor 102 or 110 is forward biased. Output lines 30 and 32 of control transformer 24 are connected in series with a primary winding 140 of transformer 118 and a resistor 142. Connected in series across primary winding 140 are a pair of oppositely poled zener diodes. In this case, the zener diodes have a common connection at their cathodes. Transformer 124 has a primary winding 146 which is connected in series with the line voltage through a resistor 148. The line voltage serves as a reference voltage, and, depending on the radar signal available at terminals 12, 14, and 16, could be, for example, a 400 cycle voltage. A pair of oppositely poled zener diodes 150 are connected in series, across primary winding 146 of transformer 124. Transformer 118 is phased such that if the potential at the upper end of the primary winding 140 goes positive, the lower end of the secondary winding 116 also becomes positive. Transformer 124 is phased such that when the potential at the upper end of the primary winding 146 goes positive, the upper end of the secondary winding 122 also becomes positive. The potential at junction 134 is substantially −12 volts, due to the −12-volt source connected to junction point 104, whenever transistors 102 or 110 are conducting. This is because the voltage drops across diodes 136 and 138 and transistors 102 and 110 are relatively small. As mentioned before, two null points occur for every 360 degrees of revolution of the armature of control transformer 22. This is assuming that the antenna of radar 10 is stationary. When the antenna is rotating, this is still substantially true if the antenna is rotating relatively slowly with respect to shaft 25. At the null points, and for a small time interval about the null points, neither transistor 102 nor transistor 110 is forward biased from the base to emitter junction. Since the base to emitter junctions are not forward biased, current does not flow in the collector circuits, and junction point 134 can possibly assume some potential other than −12 volts supplied by the source connected to junction point 104. During the aforementioned true null, the upper end of primary winding 140 of transformer 118 becomes positive and in phase with the upper end of primary winding 146 of transformer 124. Under these conditions, the voltages developed in the lower halves of secondary windings 116 and 122 are series aiding and their sum is approximately +12 volts. Since the center tap of secondary winding 116 is at −12 volts, this means that the center tap of winding 122, and hence line 128, is at zero potential, which in turn means that point 134 can approach zero potential since no current is flowing through the transistors 102 and 110 of null detector 34 during the null points. During the false null, on the other hand, the phasing of transformer 118 has changed with respect to transformer 124 and the voltages in the corresponding halves of secondary winding 116 and 122 are series opposing. Therefore, line 128 is at approximately −12 volts and hence junction 134 also is at −12 volts since again no current is flowing through the transistors of the null detector 34. At the true null, a waveform 152 having a width corresponding to several degrees of bearing is present on output line 42 and is applied to the summing point 90 located on output line 42. The D.-C. signal represented by waveform 152 effects the gating of circuit 46. The parallel R-C circuit 132 between junction point 134 and diode 130 filters the voltage at point 134 to produce a D.C. output. The waveform 152 represents the D.-C. voltage level on line 42 as a function of the angular coincidence between the rotor of control transformer 22 and the radar antenna.

The trigger pulse shown as waveform 154, is fed from output terminal 18 of radar device 10 to the input of one-shot multivibrator 60. Simultaneously with the application of the trigger pulse to multivibrator 60, a negative going output pulse is produced at a terminal 158. The waveform so produced is depicted as waveform 156. The signal appearing at junction 158 is fed to the input of ramp generator 62. Junction point 158 is connected to a +12-volt source through a pair of series resistors 160 and 162. The common junction of resistors 160 and 162 is connected to the base of a transistor 164. The emitter of transistor 164 is grounded and the collector of transistor 164 is connected through a resistor 166 to the +12-volt source. A capacitor 168 is connected across the emitter and collector terminals of transistor 164. The negative going pulse produced by one-shot multivibrator 60 is used to turn off transistor 164. When transistor 164 is turned off, the capacitor 168 begins charging from a zero potential to a +12-volt potential through resistor 166. Waveform 170 depicts the exponential charging of the capacitor 168 when transistor 164 is turned off. The voltage produced across capacitor 168 is fed to input 92 of output circuit 46.

Ramp generator 62 produces a negative going ramp, shown as waveform 172, which is fed to the input 66 of a voltage comparator 68. The output from the armature of a circular wound range potentiometer 72 is fed to the second input 70 of comparator 68. Range potentiometer 72 is symmetrically fed at two points from a +12-volt source and a −12-volt source respectively. When the voltage at input 70 is equal to the voltage at input 66, comparator 68 produces an output pulse shown as waveform 176. As shown, the armature of potentiometer 72 is at a positive potential and as the waveform 172 decreases from the positive point to a negative point, a point is reached shown as point 174, where the voltages at input 66 and input 70 are equal. A target pulse is then produced and is transmitted to summing point 90. The summation of the signal voltages from null detector 34 and voltage comparator 68 overcomes the back bias from transistor 178 in output circuit 46. The collector of transistor 178 is connected to a +12-volt source and the emitter is connected to the anode of a diode 180. The cathode of diode 180 is connected to one end of a capacitor 182 and the upper end of a resistor 184. The lower end of resistor 184 is connected to input 92. The other end of capacitor 182 is connected to a junction point 186. A clamping circuit 94, composed of a resistor 188 in parallel with a diode 190, is connected from terminal 186 to ground. The clamp circuit 94 clamps any signal appearing at terminal 186 to ground. Terminal 186 is connected to terminal 20 of the radar device 10 by a conducting line 96. When transistor 178 conducts, a positive pulse having a peak value of 12 volts appears at the emitter of transistor 178. At the same time, terminal 92 is at some positive value due to the charge across capacitor 168 equal to or less than +12 volts. If terminal 92 is at +12 volts, then diode 180 does not conduct. If terminal 92 is at some value less than +12 volts, diode 180 does conduct and the target pulse present at the base of transistor 178 is coupled through capacitor 182 to junction point 186 where it is clamped to ground. The output waveform is shown as waveform 192. The waveform appearing at the cathode of diode 180 is shown as a pulse 181 riding on an exponential waveform. If the pulse had occurred earlier in time, it would appear as a larger pulse 183 riding on the exponential waveform. If an earlier pulse 183 had occurred, the corresponding output waveform would appear as shown waveform 194. It is to be noted that the target pulse occurring at summing point 90 is actually not larger, but merely occurs at an earlier time and thus is not effectively attenuated as much as a later occurring pulse.

The advantages of the radar target generator are numerous and it is especially adapted for installation within an existing radar unit. In addition of course, a similar target generator could be used in a sonar set. The radar target generator, as disclosed, takes up a relatively small amount of space and is relatively inexpensive.

It is to be understood that the form of the invention herewith shown and described is to be taken as but one embodiment. Various changes may be made in the arrangement of circuits, and equivalent circuits may be substituted for those illustrated and described herein, and certain features of the invention may be utilized independently of the use of other features, all without departing from the spirit and scope of the invention as defined in the appended claims.

Having thus described my invention, I claim:

1. A target generator, in combination with a radar device having, a transmitter and a video section comprising:

a voltage ramp generator, synchronized with the transmitter in said radar device;

means for producing a variable D.-C. voltage;

a voltage comparator, comparing the variable voltage and the voltage ramp and producing a target pulse when the two voltages are substantially equal;

an exponential voltage generator, synchronized with the radar transmitter;

a first control transformer having a stator and rotor and windings thereon, the stator winding energized by a signal from the radar device representing the azimuth of an antenna associated with the radar;

a second control transformer having a stator and rotor and windings thereon, the stator winding connected in parallel with the first control transformer stator winding, the rotor of said second control transformer mechanically connected to the rotor of said first control transformer and permanently displaced 90 angular degrees with respect thereto;

means for varying the angular displacement of the rotors;

a null detector having an input connected across the rotor winding of said first control transformer, said detector having an output terminal;

a source of reference voltage;

a phase detector having a first input connected across the rotor winding of the second control transformer and a second input connected to said source, said phase detector having an output circuit which is common to the output terminal of said null detector, the null and phase detectors coacting to produce a signal when the position of the rotor of the first control transformer corresponds with the position of the radar antenna;

an output circuit connected to be driven into conduction, thereby producing an output signal, by the summation of a target pulse and a signal from the null detector output terminal, said output circuit being back biased by the output of said exponential voltage generator, the back biasing effect of the exponential voltage on said input circuit increasing with time between radar transmitter pulses; and, a clamp circuit, connected to clamp the output signal developed by said output circuit to a predetermined level, the resulting clamped signal providing an input to the video section of the radar device.

2. A target generator, for use with a radar device having a radar transmitter, including an antenna, and video circuits, comprising in combination:

a voltage ramp generator synchronized with the radar transmitter;

a range voltage generator, producing a variable D.-C. voltage;

a voltage comparator, producing a target pulse when the ramp and D.-C. voltages are equal;

means, including electro-mechanical rotating apparatus, for producing a gating signal when the angular displacement of the radar antenna corresponds with the angular displacement of the rotating apparatus;

a gate for gating the target pulse with the gate signal, the output of said gate connected to the radar video circuits; and, means, synchronized with the radar transmitter, for exponentially decreasing the effective gain of said gate between radar transmitter pulses.

3. In a radar device having a transmitter, including an antenna, and a video section, a simulated target apparatus, comprising in combination:

a voltage ramp generator;

an exponential voltage generator, said ramp and exponential generators being synchronized with the radar transmitter;

a source of varying D.-C. voltage;

a comparator, comparing the ramp voltage and the varying voltage and producing an output pulse when there is substantial equality thereof;

means, including rotating means, producing a signal when it is in angular coincidence with the radar antenna;

means for summing the signal and the comparator output pulse, thereby producing a resultant pulse, said means for summing being biased by the exponential voltage to effectively vary the bias of said means for summing with time; and, means for clamping the resultant pulse to a predetermined level and injecting it into the radar video section.

4. A radar target generator, for use with a radar device having transmitter pulses, an antenna and a video section, comprising in combination:

means for producing a target pulse continuously variable in time between the radar transmitter pulses;

means for producing a first signal variable with the rotation of the antenna;

means for producing a second signal pulse corresponding to the summation of said target pulse and the first signal;

means for increasingly attenuating the second signal pulse during the time between radar transmitter pulses; and, means for connecting said second signal pulse to the radar video section.

5. In a target generator for a radar device having an antenna, in combination:

a first control transformer, the stator winding thereof connected to the stator winding of a synchro transmitter associated with the radar antenna;

a second control transformer, the stator winding thereof connected in parallel with that of the first control transformer, the rotors of said control transformers mechanically fixed with respect to each other and angularly displaced 90 degrees;

a null detector having an input connected across the rotor winding of the first control transformer;

a reference voltage source; and, means for detecting the phase of a voltage induced in the second control transformer rotor windings with respect to the phase of the reference voltage, said null and phase detectors coacting to produce a gating signal whenever the voltage induced in the first control transformer rotor winding is at a substantial null and has a predetermined phase.

References Cited by the Examiner
UNITED STATES PATENTS 2,961,655  11/1960  Magnuson _____ 35—10.4 X
3,018,478  1/1962  Skillman et al. _____ 35—10.4 X CHESTER L. JUSTUS, *Primary Examiner.*

T. H. TUBBESING, *Assistant Examiner.*